(12) United States Patent
Schnase et al.

(10) Patent No.: US 10,075,562 B2
(45) Date of Patent: Sep. 11, 2018

(54) SYSTEM AND METHOD FOR PROVIDING A CLIMATE DATA ANALYTIC SERVICES APPLICATION PROGRAMMING INTERFACE

(71) Applicant: The United States of America as represented by the Administrator of the National Aeronautics and Space Administration, Washington, DC (US)

(72) Inventors: John L. Schnase, Laurel, MD (US); Daniel Q. Duffy, Gambrills, MD (US); Glenn S. Tamkin, Silver Spring, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 518 days.

(21) Appl. No.: 14/711,295

(22) Filed: May 13, 2015

(65) Prior Publication Data

US 2016/0337479 A1    Nov. 17, 2016

(51) Int. Cl.
*G06F 15/16* (2006.01)
*H04L 29/06* (2006.01)
*H04L 29/08* (2006.01)

(52) U.S. Cl.
CPC .............. *H04L 67/42* (2013.01); *H04L 67/14* (2013.01)

(58) Field of Classification Search
CPC ........... H04L 67/42; H04L 67/14; G06F 8/60; G06Q 30/0257; G06Q 30/0205
See application file for complete search history.

(56) References Cited

U.S. PATENT DOCUMENTS 9,411,569 B1 *   8/2016   Schnase ............... G06F 11/36
2002/0095454 A1 *   7/2002   Reed ................ G06Q 30/0601
                                                             709/201

(Continued)

OTHER PUBLICATIONS

Li Z, Yang C, Jin B, Yu M, Liu K, Sun M, et al. (2015) Enabling Big Geoscience Data Analytics with a Cloud-Based, MapReduce-Enabled and Service-Oriented Workflow Framework. PLoS ONE 10(3): e0116781. doi:10.1371/journal.pone.0116781.*

*Primary Examiner* — Anthony Mejia
*Assistant Examiner* — Kristoffer L S Sayoc
(74) *Attorney, Agent, or Firm* — Christopher O. Edwards; Bryan A. Geurts; Mark P. Dvorscak

(57) ABSTRACT

A system, method and computer-readable storage devices for providing a climate data analytic services application programming interface. The system includes a programming library that enables client device software to invoke the capabilities of a climate data analytics system through requests to various services supported by the climate data analytics system, and also includes a client-side communications interface that enables the programming library's methods to interact with a climate data analytics system's server interface to obtain access to the capabilities of the system. In one implementation, the programming library is implemented in the Python programming language. The programming library can include basic utilities that call a single, server-side method implemented by one of the various services supported by the climate data analytics system, and extended utilities that call a series of basic utilities and/or other extended utilities that have been placed under programmatic control in order to create client-side convenience methods and workflows.

14 Claims, 7 Drawing Sheets

(56) References Cited

U.S. PATENT DOCUMENTS

| 2004/0030741 | A1* | 2/2004 | Wolton | G06F 17/30873 709/202 |
| 2011/0010509 | A1* | 1/2011 | Flores | G06F 7/24 711/154 |
| 2011/0197124 | A1* | 8/2011 | Garaventa | G06F 17/30893 715/234 |

* cited by examiner

| PROGRAMMING LIBRARY | | MAS | PS | |
|---|---|---|---|---|
| EXTENDED UTILITIES | CONVENIENCE METHODS | MAX()<br>MIN()<br>SUM()<br>COUNT()<br>AVG()<br>DIFF() | | 204 |
| | WORKFLOWS | WEI-EXPERIMENT()<br>MODEL-EXPERIMENT() | | |
| BASIC UTILITIES | INGEST | | Put() | 203 |
| | QUERY | | GetFileNameByAttr() | |
| | ORDER | GetVarByOpTrSe() | | |
| | DOWNLOAD | Get() | Get()<br>GetFileNameByAttr() | |
| | EXECUTE | | AddMetaDataByName()<br>DeleteObject() | |
| | STATUS | CheckStatus() | CheckStatus() | |

200 — (PROGRAMMING LIBRARY)
202 — EXTENDED UTILITIES
201 — BASIC UTILITIES
205 — INTERFACE

*FIG. 2*

```
                    (HIGH-LEVEL SYNCHRONOUS OPS)
EXTENDED UTILITIES
         AVG(MAS,<parameters>)
             BEGIN
                 ORDER(MAS,GetVarByCofOpTrSe(AVERAGE),<parameters>)
                 LOOP UNTIL FINISHED
                     STATUS(MAS,ID)
                 DOWNLOAD(MAS,ID)
             END
```
~ 301

```
                    (LOW-LEVEL ASYNCHRONOUS OPS)
BASIC UTILITIES
ORDER(MAS,GetVarByCofOpTrSe(AVERAGE),<parameters>)
STATUS(MAS, ID)
DOWNLOAD(MAS, ID)
```
~ 300

*FIG. 3*

SYSTEM AND METHOD FOR PROVIDING A CLIMATE DATA ANALYTIC SERVICES APPLICATION PROGRAMMING INTERFACE

BACKGROUND

1. Technical Field

The present disclosure relates to access to climate data and more specifically to a data analytic services application programming interface for accessing climate data.

2. Introduction

Climate models generate data that are of great value to society. Climate model outputs include retrospective analyses that model the historical state of the climate, estimates of current climate conditions, and projections of future climate conditions. The data sets generated by climate models are too large to be moved from the archives where they are stored to end users where the data are typically analyzed and used. Offering climate data analytics as a service makes it easier to access climate model data and perform data analyses where the data are stored before moving reduced, more usable products to the end user for further study.

Currently, the ability of end users, applications, climate researchers, or members of the public to gain meaningful access to a climate data analytics system is limited. The current technologies are deficient because there exists no effective means for gaining access to the capabilities afforded by a climate data analytics system. What is needed is an improved approach that makes it easier to access these capabilities.

BRIEF DESCRIPTION OF THE DRAWINGS

FIG. 2 illustrates details of a CDS API programming library of basic and extended utilities to support a MERRA analytic service and a persistence service;

FIG. 3 illustrates difference between CDS API basic and extended utilities;

DETAILED DESCRIPTION

A system, method and computer-readable storage devices are disclosed which deliver a climate data analytic services application programming interface that enables access to the data and capabilities offered by a climate data analytics system.

The climate data analytic services (CDS) application programming interface (API) described herein provides an example embodiment of a web-based API designed to enable access to a climate data analytics system (CDAS). Various modifications and changes may be made to this embodiment without departing from the broader spirit and scope of this disclosure.

Figure 1:
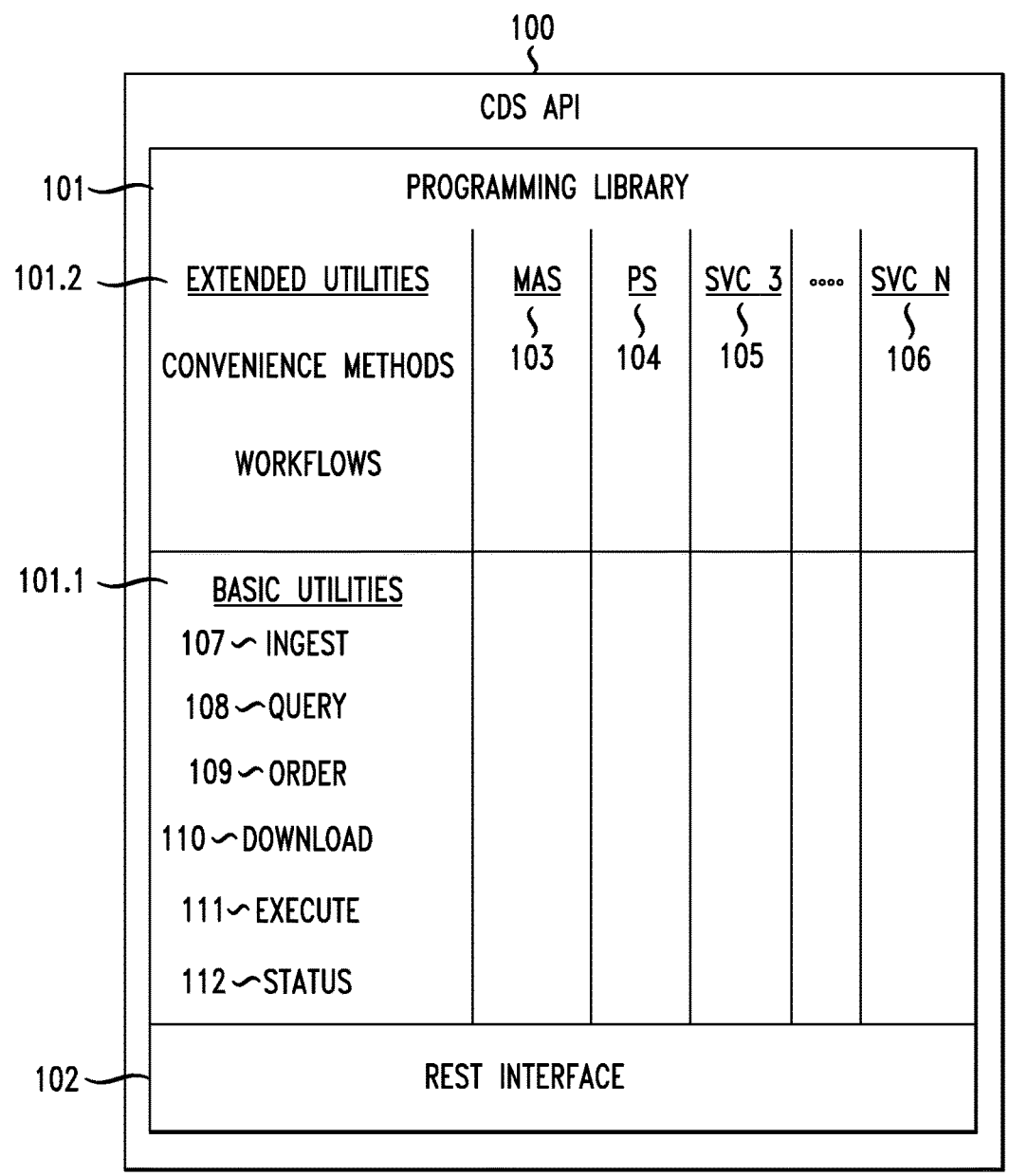
FIG. 1 illustrates an example climate data analytic services application programming interface (CDS API)

FIG. 1 illustrates an example CDS API 100. A CDS API 100 is composed of a programming library 101 that contains the programs that enable client-side software to invoke the capabilities of a CDAS and a RESTful communications interface 102 that connects the API to a CDAS's server. The programming library 101 further includes a collection of basic utilities 101.1 and an optional set of extended utilities 101.2. In the example implementation, these capabilities can be implemented as Python programming language programs, but could be implemented in any suitable programming language.

Basic utilities 101.1 are client-side API methods that call a single service-side method implemented by one of the various services supported by the CDAS. In one aspect of the API 100, these basic methods correspond to the International Organization of Standards (ISO) Open Archival Information System (OAIS) Reference Model data flow categories of an operational archive, which include ingest 107, query 108, order 109, download 110, execute 111, and status 112 methods. The basic utilities of the API thus establish a direct, one-to-one correspondence between the functional, OAIS-based capabilities of a CDAS service and client service requests. The data objects operated upon by the utilities 101.1, 101.2 also are taken to represent OAIS Reference Model Submission, Archive, and Dissemination Information Packages. These functional and object constraints can support a harmonized archive-analytics perspective advanced by the notion of climate data analytics as service (CAaaS).

FIG. 2 illustrates details of a CDS API programming library 200 having basic utility methods 201 and extended utility methods 202 to support a MERRA analytic service (MAS) and a persistence service (PS). The API's basic utilities make calls to specific server-side CDAS methods implemented by the referenced service 203. Each call represents a single action, and a series of basic utility calls operate asynchronously with respect to one another.

In contrast, extended utilities are scripts or programs that combine a collection of basic utilities and/or other extended utilities under programmatic control in order to perform a specific task 204. The extended utilities 202 can be used to implement "convenience" functions or more complex workflows made up of one or more basic utility and/or extended methods. For example, the convenience methods and workflows 204 shown in FIG. 2, are client-side programs that coordinate a series of basic utility methods 203 to perform single, synchronous operations. The programming library 200 has an interface 205 through which external programs can access the programming library 200. The programming libraries in the current embodiment of the CDS API can support a MERRA analytic service and persistence service.

FIG. 3 illustrates differences between basic utilities 300 and extended utilities 301 and how such programs could be constructed. Here, an extended utility 301 uses the basic utilities order, status, and download to create a convenience "average" method that would cause the MERRA analytic service to respond by computing the average value of a MERRA variable over a specified spatial and temporal extent. The organization of the API's library into basic and extended utilities enables improved functionality. The API's architecture enables client-side extensibility, making it easy for users to fashion more complex operations from basic and extended utilities, thereby engaging the user community in the evolving construction of the API. Further, the communications protocol implemented by the RESTful client-side API interface, like the functional organization of the API's utilities, is also based on the OAIS Reference Model's data flow categories, further supporting the correspondence between the functional, OAIS-based capabilities of a CDAS, CDAS services, the CDS API, and client software application capabilities.

The disclosure turns to a discussion of the API utilities associated with the MERRA analytic service. The basic utilities of the MERRA analytic service can include order methods that dynamically create data objects in the service, status methods for tracking the progress of an order, and download methods that retrieve the data object generated by an order request. The order methods can include a GetVariableByCollection_Operation_TimeRange_SpatialExtent_VerticalExtent request that can perform the following operations: a maximum operation that determines the maximum value of a climate variable according to user-specified input parameters, a minimum operation that determines the minimum value of a climate variable according to user-specified input parameters, a sum operation that determines the sum of the values of a climate variable according to user-specified input parameters, a count operation that determines the number of instances of a climate variable according to user-specified input parameters, an average operation that determines the arithmetic mean of a set of climate variables according to user-specified input parameters, a variance operation that determines the variance of the mean for a set of a climate variables according to user-specified input parameters, and a difference operation that determines the difference between two climate variables according to user-specified input parameters. The user-specified input parameters to the GetVariableByCollection_Operation_TimeRange_SpatialExtent_VerticalExtent request can include one or more of a variable list including specific MERRA climate variables of interest, a name of a target MERRA collection, an operation to perform, a start date for a time span to process over, an end date for a time span to process over, a minimum longitude in degrees east for a horizontal spatial bounding box lower left corner, a minimum latitude in degrees north for a horizontal spatial bounding box lower-left corner, a maximum longitude in degrees east for a horizontal spatial bounding box upper right corner, a maximum latitude in degrees north for a horizontal spatial bounding box upper right corner, a start level for a vertical spatial extent, an end level for a vertical spatial extent, an optional seasonal time span specification, or an optional user-supplied job name. The outputs of the MERRA analytic service basic utilities GetVariableByCollection_Operation_TimeRange_SpatialExtent_VerticalExtent request can include a unique session identifier for the order session that can be used to retrieve session status information and download results.

The status methods can include or invoke a CheckStatus request that checks on the progress of an order request according to user-specified input parameters including the MERRA analytic service name and a unique session identifier for the target order request. The CheckStatus method can generate outputs including a unique session identifier for the status session, a one word status update of the session identified by the input session identifier, and/or a detailed description of the target session.

The download methods can include or invoke a Get request that downloads a data object that has been dynamically created by an order request according to user-specified input parameters including the MERRA analytic service name, a unique session identifier for the target order request, and an optional name to be given the resulting data object. The Get method can generate output including the resulting data object.

The extended utilities can include MERRA analytic service convenience methods that include a Maximum method that determines the maximum value of a climate variable according to user-specified parameters, a Minimum method that determines the minimum value of a climate variable according to user-specified parameters, a Sum method that determines the sum of the values of a climate variable according to user-specified parameters, a Count method that determines the number of instances of a climate variable according to user-specified parameters, an Average method that determines the arithmetic mean of a set of climate variables according to user-specified parameters, a Variance method that determines the variance of the mean for a set of a climate variables according to user-specified parameters, and a Difference method that determines the difference between two climate variables according to user-specified parameters. Examples of the various user-specified parameters can include the method name, a variable list including specific MERRA climate variables of interest, a name of a MERRA collection to process over, an operation to perform, a start date for a time span to process over, an end date for a time span to process over, a minimum longitude in degrees east for a horizontal spatial bounding box lower left corner, a minimum latitude in degrees north for a horizontal spatial bounding box lower-left corner, a maximum longitude in degrees east for a horizontal spatial bounding box upper right corner, a maximum latitude in degrees north for a horizontal spatial bounding box upper right corner, a start level for a vertical spatial extent, an end level for a vertical spatial extent, and a download destination name. The output of the extended utility methods can be the resulting data object.

The disclosure turns now to a discussion of the utilities associated with the persistence service. The persistence service basic utilities can include ingest methods that saves data objects to the service, query methods that search for saved data, download methods that retrieve data objects from the service, execute methods that run service-defined operations, and status methods for tracking the progress of an order.

The ingest methods can include or invoke a Put request that stores a user-specified input payload in the persistence service. The Put request can generate outputs including a unique session identifier for the ingest session, a one word status update, and a detailed description of the session. The query methods can include a GetFileNameByAttribute request that performs a metadata search operation on the data objects stored in the persistence service according to user-specified selection parameters. The GetFileNameByAttribute request can generate output of data object names that have metadata attributes that match user-specified selection parameters. The download methods can include or invoke a Get request that downloads a previously ingested data object according to user-specified parameters, and a GetFileNameByAttribute request that queries for a data object name according to user-specified parameters. The download requests can generate output including the selected data object. The user-specified parameters discussed can include a filename for a data object to be operated upon, a target destination path for an output data object, and/or an optional overwrite specification.

The execute methods of the persistence service can include an AddMetaDataByName request that adds metadata to a data object stored in the persistence service according to user-specified parameters, and a DeleteObject request that removes a data object from the persistence service according to user-specified parameters. The user-specified parameters can include a file name for the target data object, a name specification for the metadata key to be associated with the target data object, and a value to be associated with the specified key. The status methods can include or invoke a CheckStatus request that checks on the progress of a service request according to user-specified input parameters consisting of unique session identifier for the target service request, and can generate outputs including a unique session identifier for the status session, a one word status update of the session identified by the input session identifier, and/or a detailed description of the target session.

Taken together, the API utilities associated with the MERRA analytic service and the utilities associated with the persistence service can complement at the client-side API level the server-side capabilities of the two services. The entire architecture can be extended by adding services to the climate data analytics system and exposing the new services through the CDS API.

Figure 4:
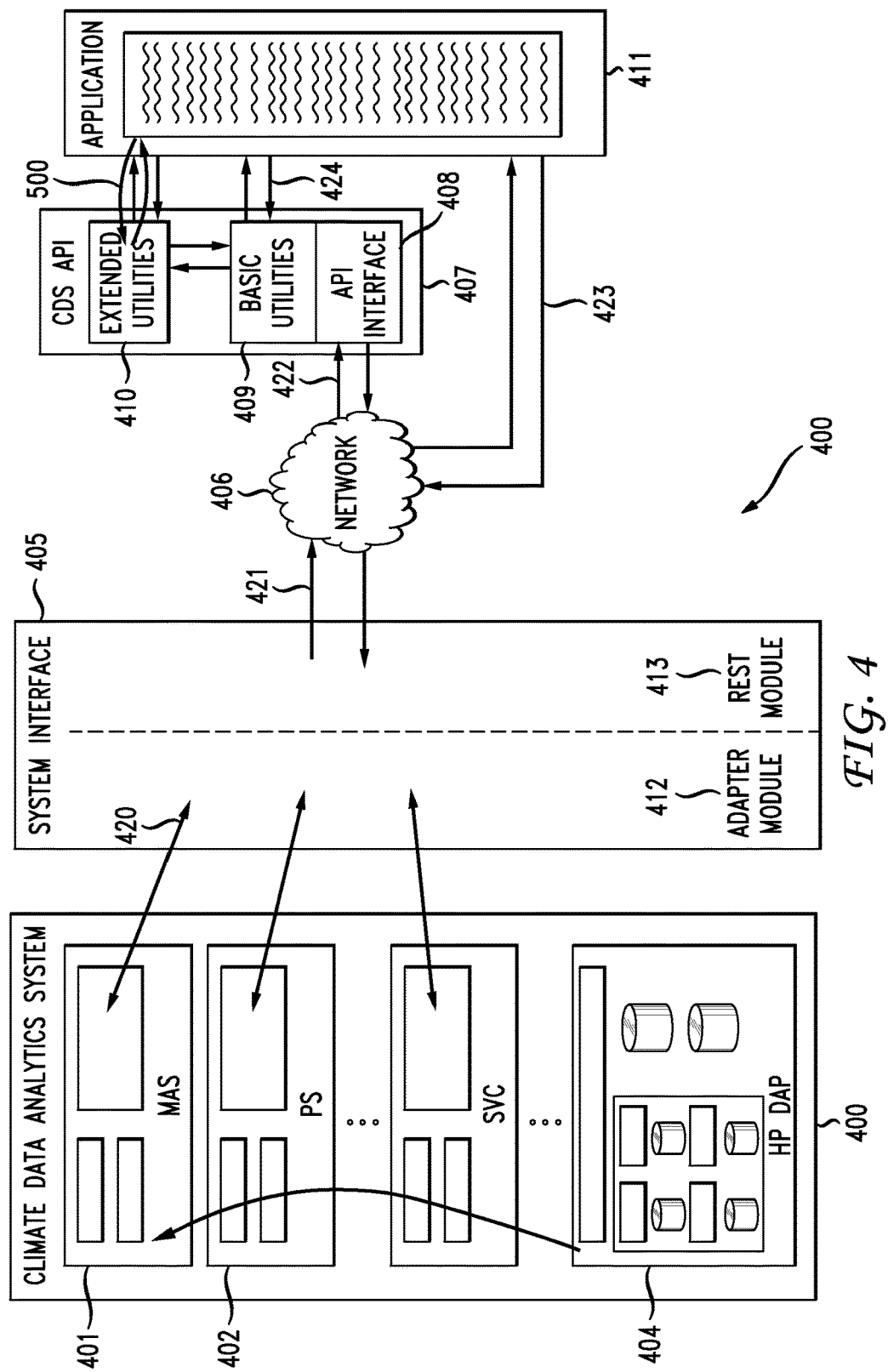
FIG. 4 illustrates an example overall architecture of a climate data analytics system accessible through a CDS API.

FIG. 4 is a diagram showing the overall architecture of a climate data analytics system 400 that has been made accessible to a client software application 411 through a CDS API 407. A climate data analytics system can include at a minimum an analytic service 401 and a persistence service 402. The CDS API is a client-side API that can consume CDAS Web service endpoints and abstract them into high-level functions and methods that can improve the ability of software developers and client applications to access the capabilities of the underlying climate data analytics system.

CDAS capabilities are made available to the CDS API through the CDAS's server-side system interface 405 and the CDS API's client-side interface 408. The server-side interface 405 and the client-side interface 408 each have an in-facing and an out-facing component. On the services side, the in-facing "adapter" component of the CDAS interface 412 maps service requests to specific operations implemented by CDAS services. The out-facing component of the CDAS interface is a Representational State Transfer (REST) server 413 that exposes Web services endpoints consumable by external clients. On the client side, the out-facing component of the API's interface 408 communicates with the CDAS's RESTful server to enable the API's access to CDAS capabilities, while its in-facing component wraps the CDAS's Web services endpoints into the library methods of the API's basic utilities. The API's high-level extended utilities 410 can connect the API's low-level basic utilities 409 through traditional method invocations. Client applications 411 can connect directly to the CDAS through the system interface's raw Web service endpoints 423, and/or connect to the CDAS through the improved access capabilities of the API through traditional library bindings and method invocations of the CDS API's basic and extended utilities 424. The interface 405 can be accessible to outside programs or devices via a network 406.

In one embodiment, MERRA analytic service 401 and persistence service 402 methods, the in-facing adapter map of the CDAS 420, the out-facing RESTful server communications protocol of the CDAS server 421, the out-facing communications protocol of the API client interface 422, and basic utility methods 409 of the API are all based on the OAIS data flow categories of an operational archive.

This end-to-end coherence built around the OAIS Reference Model has several implications and can impart several advantages. This approach can harmonize the analytics and large-scale archive world views of how to address the big data challenges in the climate science domain. This approach treats the universe of data analytic services as an environment for long-term digital preservation and targets a designated community, climate scientists and other users who wish to work with climate model data. The system can provide a very regular API, which can simplify client and server construction by creating a consistent component taxonomy and simple, standard communications policies. Individuals in the archive community can easily recognize the OAIS constructs, which should make integrating services far easier, such as integrating analytic capabilities into an existing OAIS-compliant operational archive. This approach supports the notion of a dynamic archive in which the system can create realizable objects on demand rather than creating collections of data objects that are stored as static data products.

This approach should reduce client/server interoperability problems and the effort required by service providers to integrate new capabilities into an operational context. It also provides a template and method for allowing non-compliant applications to become participating services in a climate data analytics system. For example, integrating Earth System Grid Federation (ESGF), OpenDAP, Web Processing Service (WPS), or other systems into the architecture becomes a matter of writing a CDAS adapter that categorizes the functionality provided by the new service into the OAIS ingest, query, order, download, execute, and status data flow categories and building the map between the new functions and the appropriate RESTful OAIS server actions.

Figure 5:
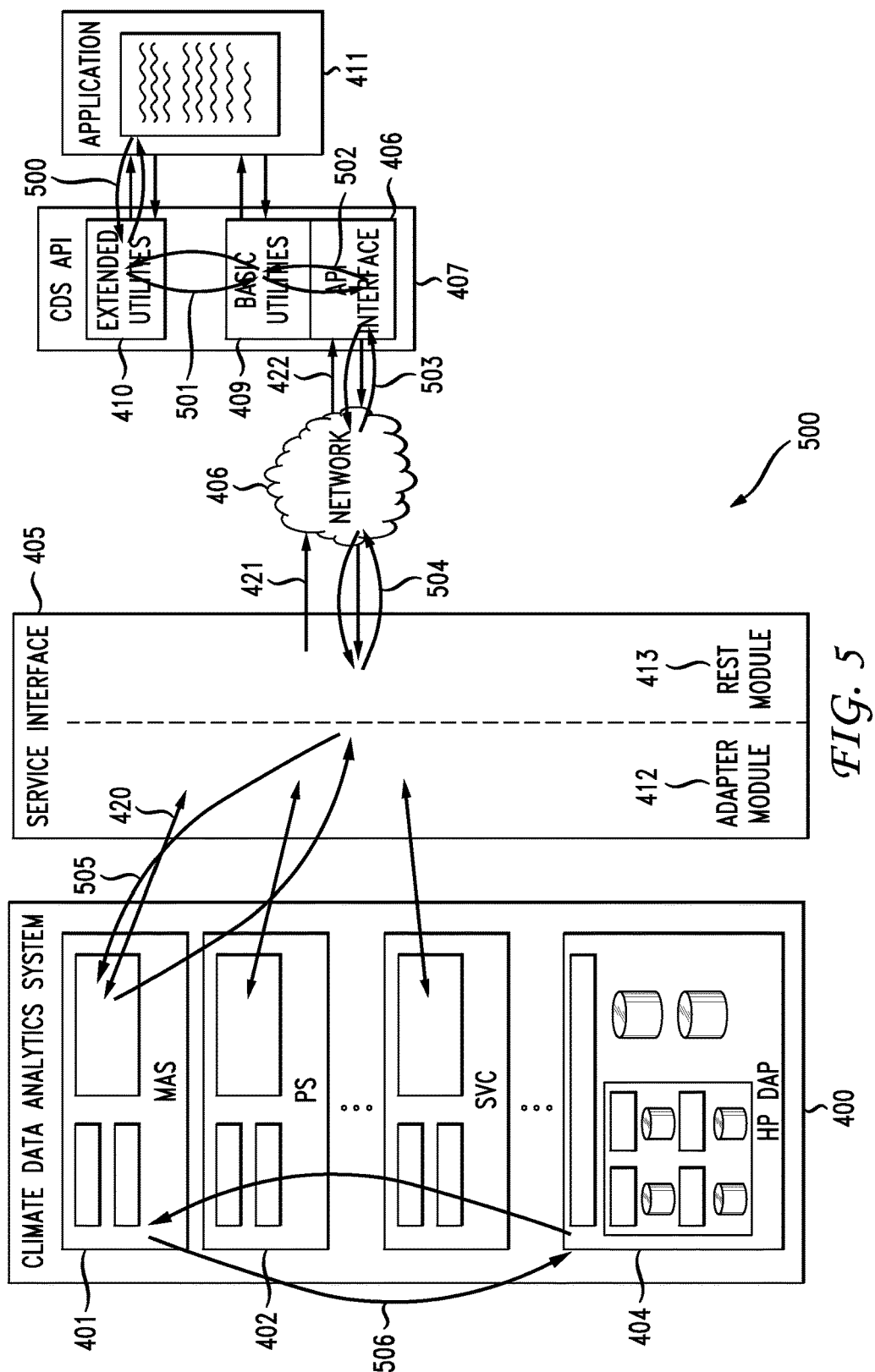
FIG. 5 is a flowchart showing an example use of a CDS API by a client application.

FIG. 5 is a diagram and flowchart showing an exemplary use of the CDS API 407 by a client application 411. In an example call 500 on the API's extended utilities 410 to find the average temperature over a specified spatial and temporal span, the utility's average method would be based on 501 the average extended utility method in the basic utilities 409. The basic utilities 409 translate the method invocation into RESTful service requests 502 that are communicated through the network 503, 504 to the climate data analytics system's interface 405, which then maps the request to the appropriate service and operation 505, in this example, the analytic service's order operation. The analytic service 400 computes the result using the CDAS's high-performance data analytics compute-storage platform 404 and returns the response back through the chain to the calling application 506.

Figure 6:
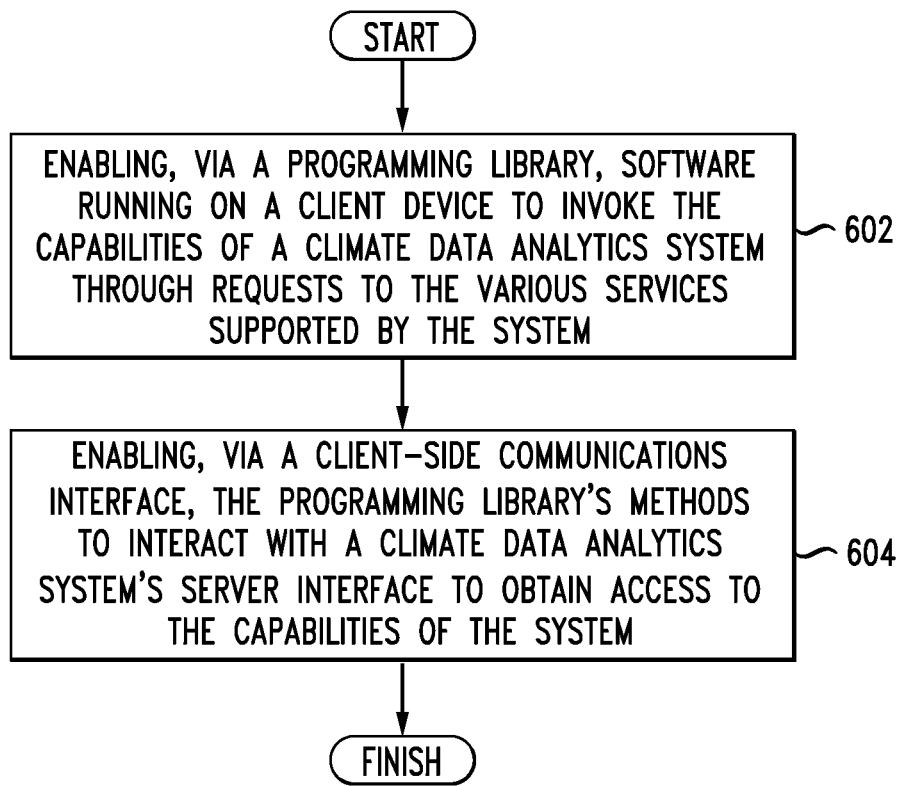
FIG. 6 illustrates an example method embodiment.
Figure 7:
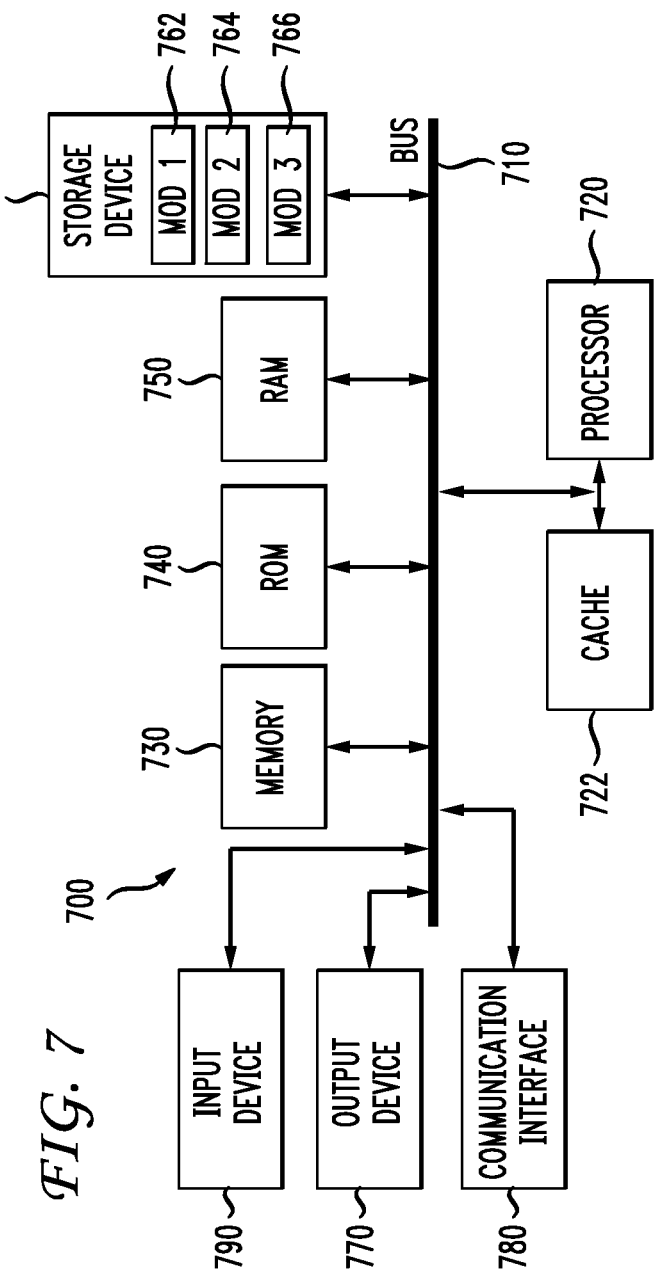
FIG. 7 illustrates an example system embodiment.

Having disclosed some basic system components and concepts, the disclosure now turns to the exemplary method embodiment shown in FIG. 6. For the sake of clarity, the method is described in terms of an exemplary system 700 as shown in FIG. 7 configured to practice the method. The steps outlined herein are exemplary and can be implemented in any combination thereof, including combinations that exclude, add, or modify certain steps.

A system 700 configured according to this disclosure can include a programming library with functions that enable software running on a client device to invoke the capabilities of a climate data analytics system through requests to the various services supported by the system (602). The programming library can be implemented in Python or some other suitable compiled and/or interpreted language. The programming library can include basic utilities that call a single, server-side method implemented by one of the various services supported by a climate data analytics system, as well as extended utilities that call a series of basic utilities and/or other extended utilities that have been placed under programmatic control in order to create client-side convenience methods and workflows. In one embodiment, the basic methods can correspond to the International Organization for Standards (ISO) Open Archival information System (OAIS) Reference Model data flow categories of an operational archive.

For example, the OAIS reference model data flow categories can include multiple functions. One function is an ingest method that inputs data objects to a service, wherein input parameters specify the name of a target service, the name of an operation supported by the target service, and operation-specific parameters, and output returns a unique session identifier for the operation, a description of the session, and a status message. Another function is a query method that retrieves metadata relating to data objects in a service, wherein input parameters specify the name of a target service, the name of an operation supported by the target service, and operation-specific parameters, and output returns the query result and a status message. Another function is an order method that dynamically creates data or subset objects in a service, wherein input parameters specify the name of a target service, the name of an operation supported by the target service, and operation-specific parameters, and output returns a unique session identifier for operation, a description of the session, and a status message. Another function is a download method that retrieves data objects from a service, wherein input parameters specify the name of a target service, the session identifier for the order request that created the downloadable data object, and output returns the downloadable data object and a status message. Another function is an execute method that initiates a service-definable operation, wherein input parameters specify the name of a target service, the name of an operation supported by the target service, and operation-specific parameters, and output returns a unique session identifier for the operation, a description of the operation session, a status message, and the results generated by the operation. Yet another function includes a status method that checks the progress of an order operation, wherein input parameters specify the name of a target service and a unique session identifier, and output returns a unique session identifier for the operation, a description of the session, and a status message.

The data objects used by the various functions can represent ISO OAIS Reference Model Submission Information Packages, Archive Information Packages, and Dissemination Information Packages. The basic and extended utilities can enable access to the specific capabilities of a climate data analytics system, such as a Modern-Era Retrospective Analysis for Research and Applications (MERRA) analytic service and a persistence service. The basic and extended utilities in the programming library can enable access to the specific capabilities of a climate data analytics system including a variety of additional services.

The system can include a client-side communications interface that enables the programming library's functions to interact with a climate data analytics system's server interface to obtain access to the capabilities of the system (604). In the client-side communications interface, the basic utility methods can be communicatively linked to a climate data analytics system's server device through ISO OAIS Reference Model-based representational state transfer uniform resource locators.

Various embodiments of the disclosure are described in detail below. While specific implementations are described, it should be understood that this is done for illustration purposes only. Other components and configurations may be used without parting from the spirit and scope of the disclosure.

A brief description of a basic general purpose system or computing device in FIG. 7 which can be employed to practice the concepts, methods, and techniques disclosed is provided below.

With reference to FIG. 7, an exemplary system and/or computing device 700 includes a processing unit (CPU or processor) 720 and a system bus 710 that couples various system components including the system memory 730 such as read only memory (ROM) 740 and random access memory (RAM) 750 to the processor 720. The system 700 can include a cache 722 of high-speed memory connected directly with, in close proximity to, or integrated as part of the processor 720. The system 700 copies data from the memory 730 and/or the storage device 760 to the cache 722 for quick access by the processor 720. In this way, the cache provides a performance boost that avoids processor 720 delays while waiting for data. These and other modules can control or be configured to control the processor 720 to perform various operations or actions. Other system memory 730 may be available for use as well. The memory 730 can include multiple different types of memory with different performance characteristics. It can be appreciated that the disclosure may operate on a computing device 700 with more than one processor 720 or on a group or cluster of computing devices networked together to provide greater processing capability. The processor 720 can include any general purpose processor and a hardware module or software module, such as module 1 762, module 2 764, and module 3 766 stored in storage device 760, configured to control the processor 720 as well as a special-purpose processor where software instructions are incorporated into the processor. The processor 720 may be a self-contained computing system, containing multiple cores or processors, a bus, memory controller, cache, etc. A multi-core processor may be symmetric or asymmetric. The processor 720 can include multiple processors, such as a system having multiple, physically separate processors in different sockets, or a system having multiple processor cores on a single physical chip. Similarly, the processor 720 can include multiple distributed processors located in multiple separate computing devices, but working together such as via a communications network. Multiple processors or processor cores can share resources such as memory 730 or the cache 722, or can operate using independent resources. The processor 720 can include one or more of a state machine, an application specific integrated circuit (ASIC), or a programmable gate array (PGA) including a field PGA.

The system bus 710 may be any of several types of bus structures including a memory bus or memory controller, a peripheral bus, and a local bus using any of a variety of bus architectures. A basic input/output (BIOS) stored in ROM 740 or the like, may provide the basic routine that helps to transfer information between elements within the computing device 700, such as during start-up. The computing device 700 further includes storage devices 760 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 760 can include software modules 762, 764, 766 for controlling the processor 720. The system 700 can include other hardware or software modules. The storage device 760 is connected to the system bus 710 by a drive interface. The drives and the associated computer-readable storage devices provide nonvolatile storage of computer-readable instructions, data structures, program modules and other data for the computing device 700. In one aspect, a hardware module that performs a particular function includes the software component stored in a tangible computer-readable storage device in connection with the necessary hardware components, such as the processor 720, bus 710, display 770, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 700 is a small, handheld computing device, a desktop computer, or a computer server. When the processor 720 executes instructions to perform "operations", the processor 720 can perform the operations directly and/or facilitate, direct, or cooperate with another device or component to perform the operations.

Although the exemplary embodiment(s) described herein employs the hard disk 760, other types of computer-readable storage devices which can store data that are accessible by a computer, such as magnetic cassettes, flash memory cards, digital versatile disks (DVDs), cartridges, random access memories (RAMs) 750, read only memory (ROM) 740, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 700, an input device 790 represents any number of input mechanisms, such as a microphone for speech, a touch-sensitive screen for gesture or graphical input, keyboard, mouse, motion input, speech and so forth. An output device 770 can also be one or more of a number of output mechanisms known to those of skill in the art. In some instances, multimodal systems enable a user to provide multiple types of input to communicate with the computing device 700. The communications interface 780 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 720. The functions these blocks represent may be provided through the use of either shared or dedicated hardware, including, but not limited to, hardware capable of executing software and hardware, such as a processor 720, that is purpose-built to operate as an equivalent to software executing on a general purpose processor. For example the functions of one or more processors presented in FIG. 7 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 740 for storing software performing the operations described below, and random access memory (RAM) 750 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 700 shown in FIG. 7 can practice all or part of the recited methods, can be a part of the recited systems, and/or can operate according to instructions in the recited tangible computer-readable storage devices. Such logical operations can be implemented as modules configured to control the processor 720 to perform particular functions according to the programming of the module. For example, FIG. 7 illustrates three modules Mod1 762, Mod2 764 and Mod3 766 which are modules configured to control the processor 720. These modules may be stored on the storage device 760 and loaded into RAM 750 or memory 730 at runtime or may be stored in other computer-readable memory locations.

One or more parts of the example computing device 700, up to and including the entire computing device 700, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 720 can include all types of processors disclosed herein, including a virtual processor. However, when referring to a virtual processor, the processor 720 includes the software components associated with executing the virtual processor in a virtualization layer and underlying hardware necessary to execute the virtualization layer. The system 700 can include a physical or virtual processor 720 that receive instructions stored in a computer-readable storage device, which cause the processor 720 to perform certain operations. When referring to a virtual processor 720, the system also includes the underlying physical hardware executing the virtual processor 720.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply generally to any other kinds of large sets of climate data or other similar data. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A system providing a climate data analytic services application programming interface, the system comprising:
   a programming library comprising methods that enable software running on a client device to invoke capabilities of a climate data analytics system through requests to various services supported by the climate data analytics system; and
   a client-side communications interface that enables the programming library's methods to interact with a climate data analytics system's server interface to obtain access to the capabilities of the system; wherein the programming library further comprises:
basic utilities that call a single, server-side method implemented by one of the various services supported by the climate data analytics system;
extended utilities that call a series of basic utilities that have been placed under programmatic control in order to create client-side convenience methods and workflows; and
wherein the basic utilities correspond to the International Organization for Standards Open Archival information System Reference Model data flow categories of an operational archive comprising:
ingest methods that input data objects to a service, wherein input parameters specify a name of a target service, a name of an operation supported by the target service, and operation-specific parameters, and output returns a unique session identifier for the operation, a description of the session, and a status message;
query methods that retrieve metadata relating to data objects in a service, wherein input parameters specify the name of a target service, the name of an operation supported by the target service, and operation-specific parameters, and output returns a query result and a status message;
order methods that dynamically create data or subset objects in a service, wherein input parameters specify the name of a target service, the name of an operation supported by the target service, and operation-specific parameters, and output returns a unique session identifier for operation, a description of the session, and a status message;
download methods that retrieve data objects from a service, wherein input parameters specify the name of a target service, a session identifier for the order request that created a downloadable data object, and output returns the downloadable data object and a status message;
execute methods that initiate a service-definable operation, wherein input parameters specify the name of a target service, the name of an operation supported by the target service, and operation-specific parameters, and output returns a unique session identifier for the operation, a description of an operation session, a status message, and the results generated by the operation; and
status methods that check a progress of an order operation, wherein input parameters specify the name of a target service and a unique session identifier, and output returns a unique session identifier for the operation, a description of the session, and a status message.

2. The system of claim 1, wherein the data objects represent International Organization for Standards Open Archival Information System Reference Model Submission Information Packages, Archive Information Packages, and Dissemination Information Packages.

3. The system of claim 1, wherein the basic utilities and the extended utilities of the programming library enable access to specific capabilities of a climate data analytics system comprising:
   a Modern-Era Retrospective Analysis for Research and Applications (MERRA) analytic service; and
   a persistence service.

4. The system of claim 3, wherein MERRA analytic service basic utilities provide methods comprising:
   order methods that dynamically creates data objects in the service;
   status method for tracking a progress of an order; and
   download methods that retrieves the data object generated by an order request.

5. The system of claim 4, wherein order methods comprises a GetVariableByCollection_Operation_TimeRange_SpatialExtent_VerticalExtent request that performs operations comprising:
   a maximum operation that determines a maximum value of a climate variable according to user-specified input parameters;
   a minimum operation that determines a minimum value of a climate variable according to user-specified input parameters;
   a sum operation that determines a sum of the values of a climate variable according to user-specified input parameters;
   a count operation that determines a number of instances of a climate variable according to user-specified input parameters;
   an average operation that determines an arithmetic mean of a set of climate variables according to user-specified input parameters;

a variance operation that determines a variance of the mean for a set of a climate variables according to user-specified input parameters; and a difference operation that determines a difference between two climate variables according to user-specified input parameters.

6. The system of claim 5, wherein the user-specified input parameters of the GetVariableByCollection_Operation_TimeRange_SpatialExtent_VerticalExtent request comprise:

a request name;
a variable list comprising specific MERRA climate variables of interest;
a name of a target MERRA collection;
an operation to perform;
a start date for a time span to process over;
an end date for a time span to process over;
a minimum longitude in degrees east for a horizontal spatial bounding box lower left corner;
a minimum latitude in degrees north for a horizontal spatial bounding box lower-left corner;
a maximum longitude in degrees east for a horizontal spatial bounding box upper right corner;
a maximum latitude in degrees north for a horizontal spatial bounding box upper right corner;
a start level for a vertical spatial extent;
an end level for a vertical spatial extent;
an optional seasonal time span specification; and
an optional user-supplied job name.

7. The system of claim 5, wherein output of the GetVariableByCollection_Operation_TimeRange_SpatialExtent_VerticalExtent request comprises a unique session identifier for an order session that can be used to retrieve session status information and download results.

8. The system of claim 4, wherein status methods comprise a CheckStatus request that checks on progress of an order request according to user-specified input parameters comprising a MERRA analytic service name and a unique session identifier for a target order request.

9. The system of claim 8, wherein output of the CheckStatus request comprises a unique session identifier for a status session, a one word status update of the session identified by an input session identifier, and a detailed description of a target session.

10. The system of claim 4, wherein download methods comprise a Get request that downloads a data object that has been dynamically created by an order request according to user-specified input parameters comprising a MERRA analytic service name, a unique session identifier for a target order request, and an optional name to be given a resulting data object.

11. The system of claim 10, wherein output of the Get request comprises the resulting data object.

12. The system of claim 3, wherein MERRA analytic service extended utilities include convenience methods comprising:

a Maximum method that determines a maximum value of a climate variable according to user-specified parameters;
a Minimum method that determines a minimum value of a climate variable according to user-specified parameters;
a Sum method that determines a sum of the values of a climate variable according to user-specified parameters;
a Count method that determines a number of instances of a climate variable according to user-specified parameters;
an Average method that determines an arithmetic mean of a set of climate variables according to user-specified parameters;
a Variance method that determines a variance of the mean for a set of a climate variables according to user-specified parameters; and
a Difference method that determines a difference between two climate variables according to user-specified parameters.

13. The system of claim 12, wherein the user-specified parameters comprise:

a method name;
a variable list comprising specific MERRA climate variables of interest;
a name of a MERRA collection to process over;
an operation to perform;
a start date for a time span to process over;
an end date for a time span to process over;
a minimum longitude in degrees east for a horizontal spatial bounding box lower left corner;
a minimum latitude in degrees north for a horizontal spatial bounding box lower-left corner;
a maximum longitude in degrees east for a horizontal spatial bounding box upper right corner;
a maximum latitude in degrees north for a horizontal spatial bounding box upper right corner;
a start level for a vertical spatial extent;
an end level for a vertical spatial extent; and
a download destination name.

14. The system of claim 12, wherein output of the extended utilities comprises a resulting data object.

* * * * *